Sept. 25, 1934.   J. A. BATA   1,975,034
APPARATUS FOR THE MANUFACTURE OF FOOTWEAR
Filed Nov. 23, 1932   10 Sheets-Sheet 1

Fig. 4

Sept. 25, 1934. J. A. BATA 1,975,034
APPARATUS FOR THE MANUFACTURE OF FOOTWEAR
Filed Nov. 23, 1932 10 Sheets-Sheet 4

Fig. 5.

Sept. 25, 1934.   J. A. BATA   1,975,034
APPARATUS FOR THE MANUFACTURE OF FOOTWEAR
Filed Nov. 23, 1932   10 Sheets-Sheet 5

Sept. 25, 1934. J. A. BATA 1,975,034
APPARATUS FOR THE MANUFACTURE OF FOOTWEAR
Filed Nov. 23, 1932 10 Sheets-Sheet 6

Sept. 25, 1934.     J. A. BATA     1,975,034
APPARATUS FOR THE MANUFACTURE OF FOOTWEAR
Filed Nov. 23, 1932     10 Sheets-Sheet 9

Fig. 15.

Patented Sept. 25, 1934

1,975,034

UNITED STATES PATENT OFFICE 1,975,034

APPARATUS FOR THE MANUFACTURE OF FOOTWEAR

Jan A. Bata, Zlin, Czechoslovakia

Application November 23, 1932, Serial No. 644,305
In Czechoslovakia November 2, 1931

9 Claims. (Cl. 12—1)

This invention comprises a combined feed and work-treatment apparatus for the continuous manufacture of shoes or footwear of all kinds. The apparatus is to be distinguished from the feed apparatus already known whereby only a last or a last with a shoe is fed from one work position to another.

The feed and work-treatment apparatus embodies carriage devices, having functions as follows:—

1. The apparatus feeds the last or the last with the shoe to the stationary working position of the worker, right under his hand.

2. It brings the last or the last with the shoe into the position necessary for each individual operation, the last automatically adjusting itself into the different positions, e. g. with the sole downwards, with the side upwards, and so on, during the movement of the feed apparatus.

3. It turns the shoe in the course of the work-treatment in the direction desired by the worker.

4. It feeds the shoe forwards after each completed operation.

5. It feeds along with the last or with the shoe the material necessary for the carrying out of the individual work operations or the constituent parts necessary for this purpose, to the working position.

6. It is arranged in such a manner that automatic work-treatment machines can be set going for each individual centrally controllable work apparatus.

By this means manual labour is reduced and an approach made to the whole manufacture being carried out automatically.

The invention will now be described, by way of example, with reference to the annexed drawings, in which:—

Figure 1:
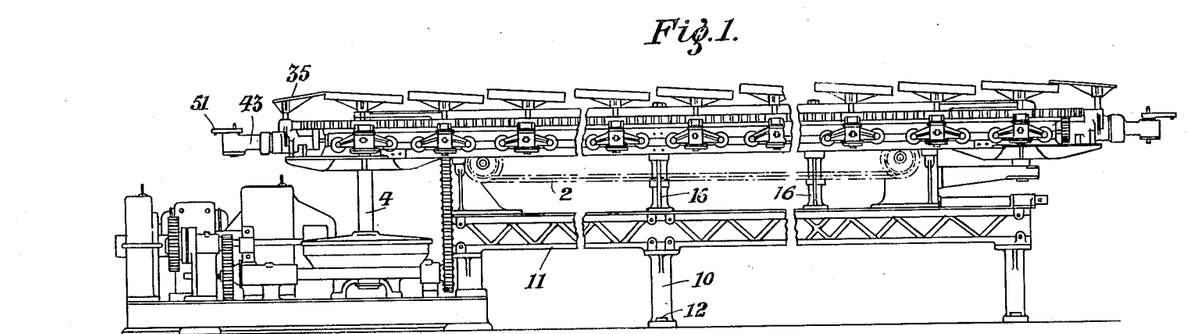
Fig. 1 is a complete elevation of the feed and work-treatment apparatus.
Figure 2:
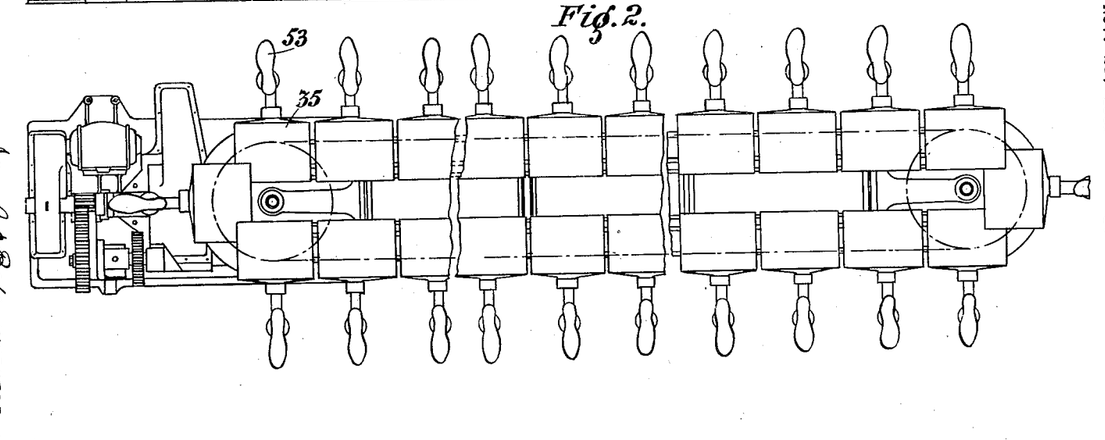
Fig. 2 is a plan view of this apparatus.

Referring to the drawings,

The apparatus as shown in Figs. 1 and 2 comprises in general driving mechanism as illustrated at the left hand side of these figures and a feed track which, with its tensioning mechanism, is shown at the right hand part of the said Figs. 1 and 2, this track serving to move carriages having a last and a table serving for the simultaneous feeding of the necessary materials.

Figure 3:
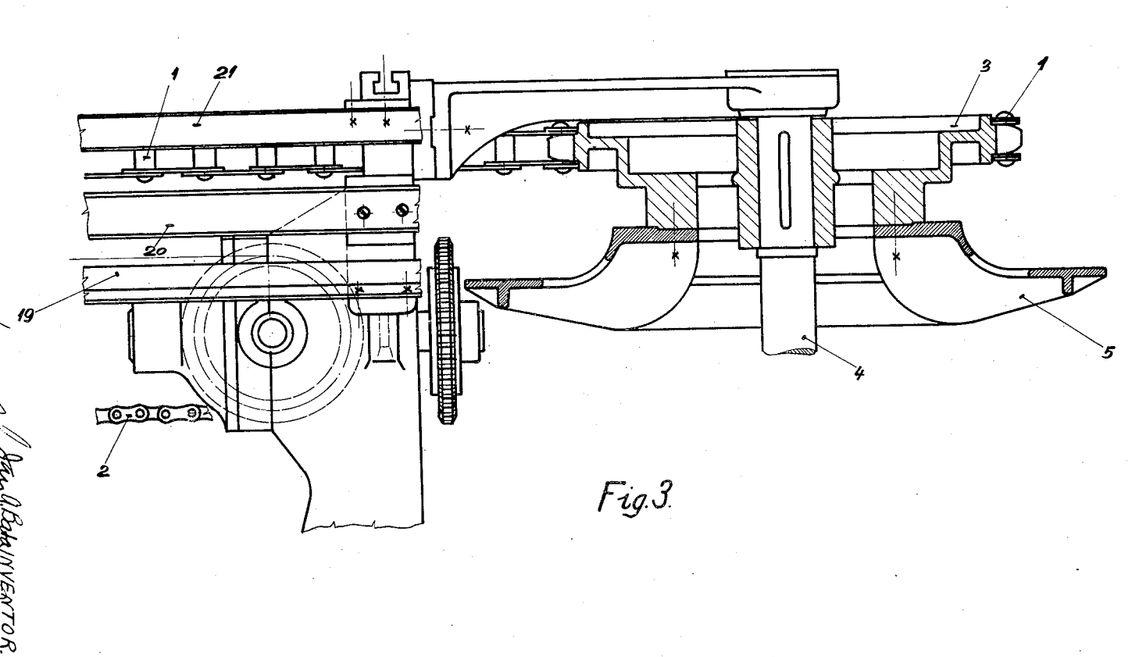
Fig. 3 is a view of the driving gear from the working side of the apparatus.
Figure 4:
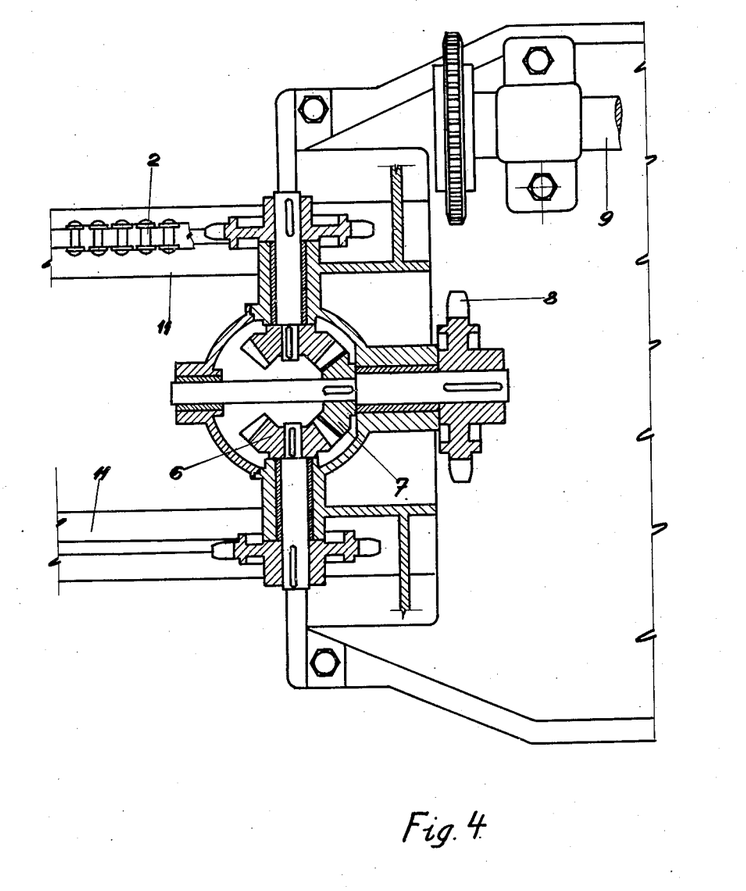
Fig. 4 is a sectional view of the chain arrangement whereby tooth segment mechanism is actuated.
Figure 5:
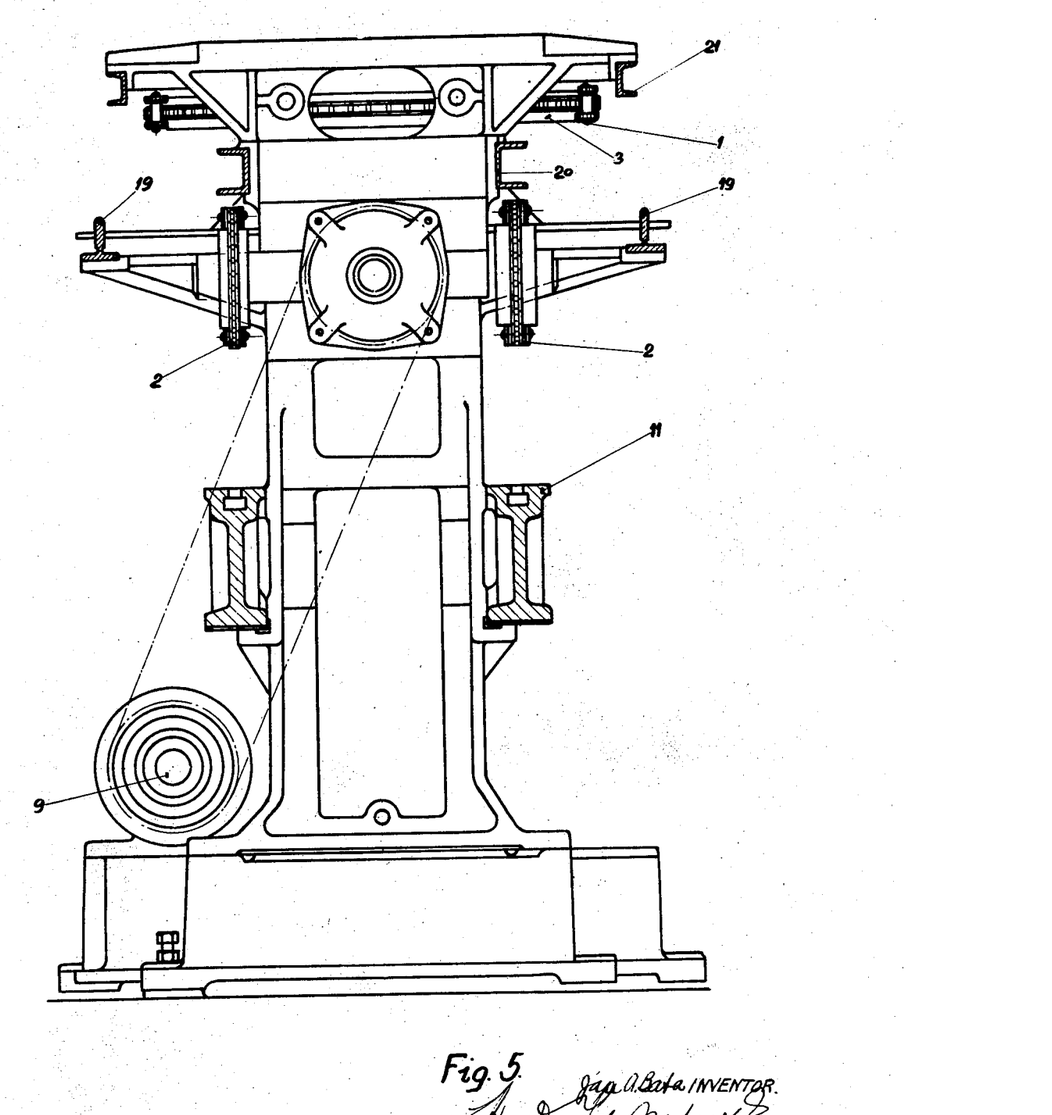
Fig. 5 is a complete view of the driving gear.

The chain 1 (Figs. 3, 4 and 5) carries out the drive of the feed apparatus in respect of feeding the feed carriages from one working position to another, and the chain 2 sets in operation the mechanism of the individual carriages as soon as these arrive into the working positions during their movement on the track. The chain 1 runs over the sprocket wheel 3 of which the vertical axle 4 is driven by driving mechanism with a periodic acceleration or retardation. A disc 5 is fixed on the wheel 3 by screw means, and this disc serves for turning round the carriage from one working side to the other working side. The chains 2 (Figs. 3, 4 and 5) operate the carriage mechanism on both working sides of the apparatus, and are themselves simultaneously driven by bevel wheels 6, 7 and sprocket wheel 8 (Fig. 4) which receives its drive through a chain from the shaft 9 of the driving mechanism (Figs. 4 and 5).

Figure 6:
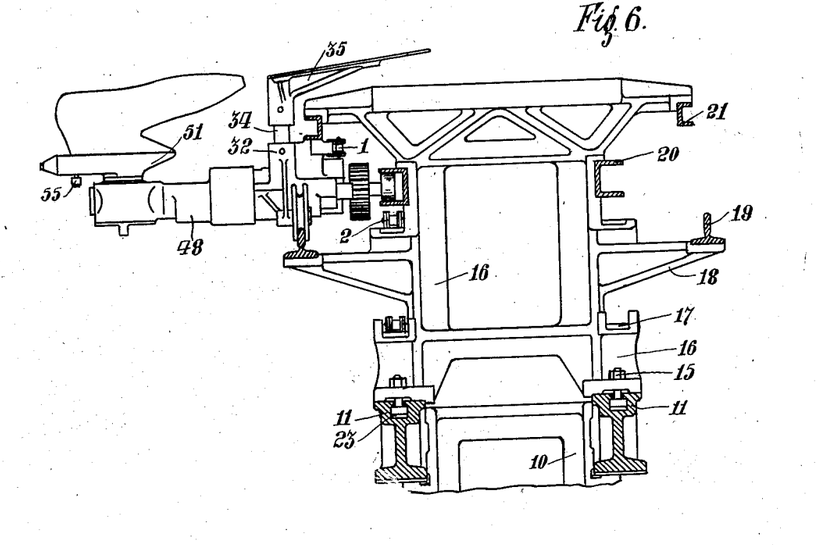
Fig. 6 is a sectional view through the feed track, also illustrating the arrangement of the carriage on the rails.
Figures 7, 16, 17:
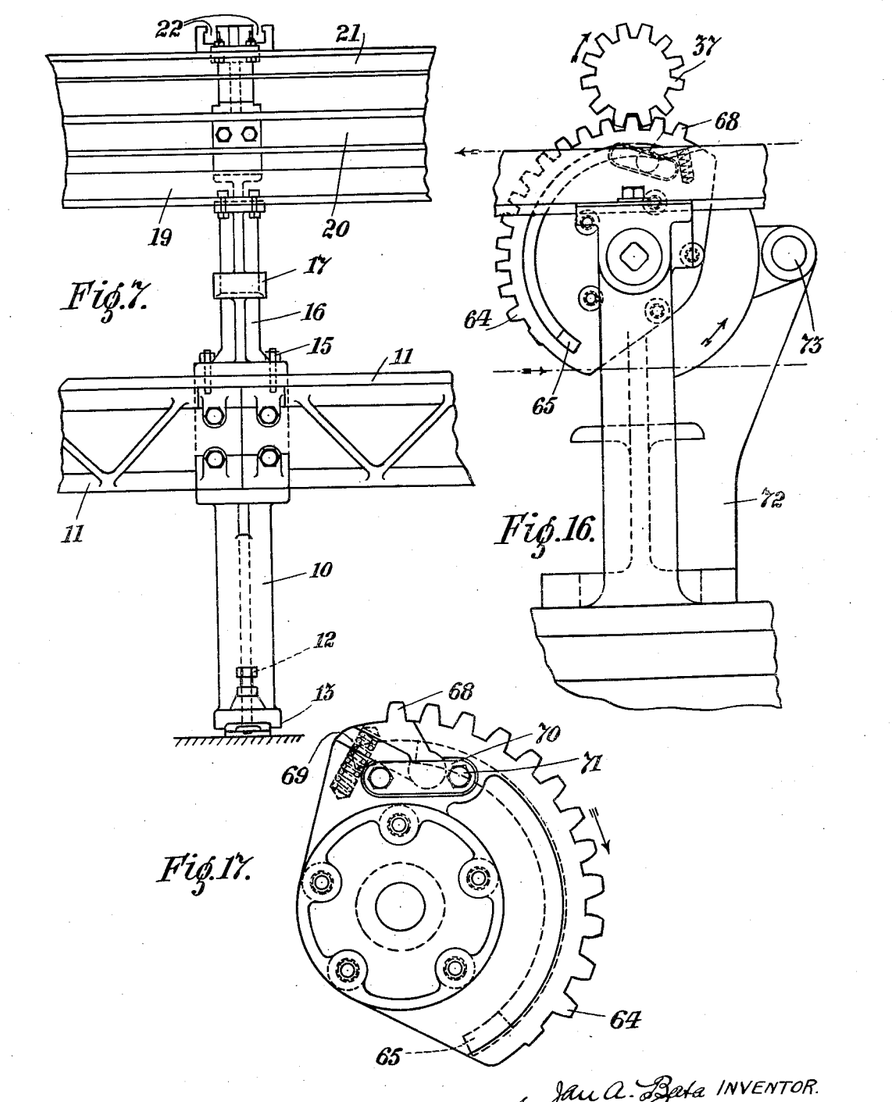
Fig. 7 illustrates a view of the connecting parts of the main carrier of the feed track as seen from the working side of the apparatus.
Fig. 16 is a view of the stand and segment arrangement from the working side of the apparatus.
Fig. 17 is a view of the segment from the inner side of the track showing in detail the spring tooth 75 of the segment.

The feed track consists of cast iron stands 10 (Figs. 1, 6 and 7) which also serve for the cross connection of the longitudinal beams of the track (Figs. 1, 6 and 7). These stands 10 have positioning feet held by studs 12 screw threaded in their foot plates, which feet are provided at their lower end with a thrust plate 13.

On the longitudinal beams 11 of the track (Figs. 1, 6 and 7) cast iron stands 16 are likewise fixed by screws 15. These stands 16 have side guides 17 (Fig. 6) which serve to guide the chains 2 driving the mechanism of the individual carriages (Figs. 1, 3, 4 and 6). On brackets 18 (Fig. 6) rails 19 of inverted T-shape are fastened serving for the guiding of the feed carriages. The channel iron 20 constitutes an inner guide and the channel iron 21 constitutes an upper guide for the carriages fed by the chain 1 (Figs. 1 to 6).

The upper part of the stand 16 is provided with grooves 22 which serve for the attachment of the machines and devices necessary for the automatic manufacture.

The longitudinal grooves 23 in the beams 11 of the feed track (Figs. 1 and 6) serve on the one hand for the attachment of the upper stand 16 in any desired position, e. g. outwardly from the stand 10 in Fig. 1 and on the other hand for the attachment of the stand devices for the gear for turning the last on the carriage, and finally for the attachment of all the remaining work devices for the automatic operating machines and mechanism.

The tensioning arrangement (Figs. 8 and 9) serves for correspondingly tensioning the driving chains 1 and 2 and consists of a tensioning disc 24 which the chain 1 feeding the carriages from one work position to another passes round. This tensioning disc 24 rotates on a shaft 25 in unison with a disc 26 which conducts the carriage from one working side to the other.

Figure 8:
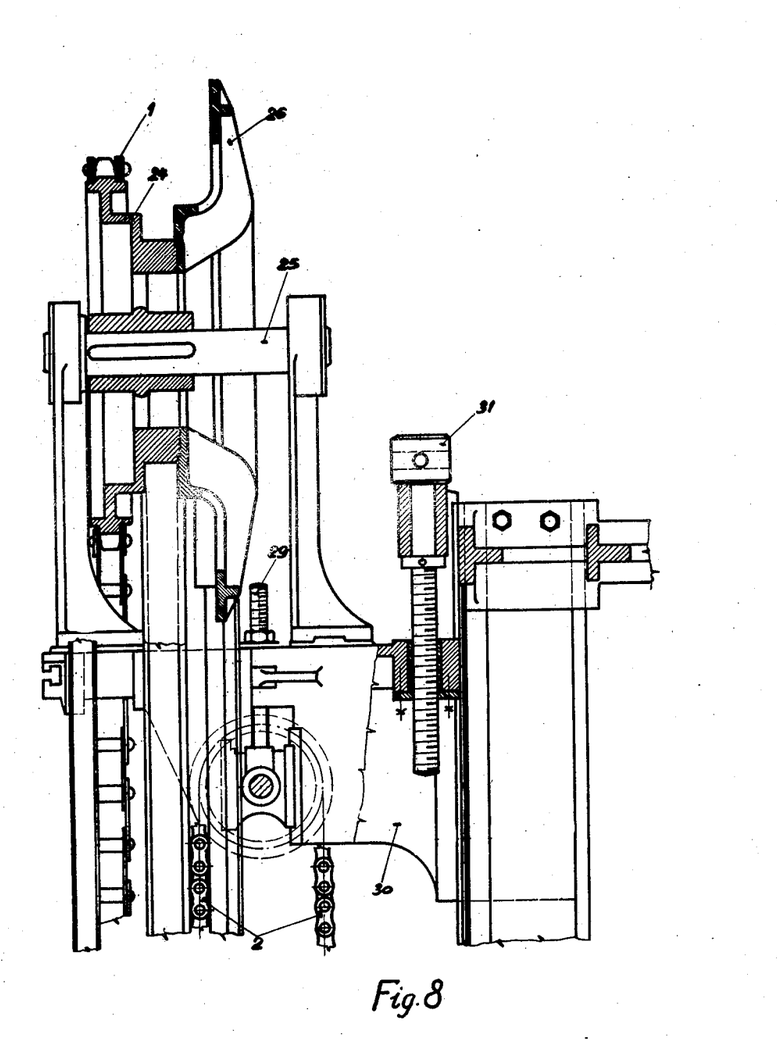
Fig. 8 is a view of a tensioning device of the apparatus also seen from the working side thereof.
Figure 9:
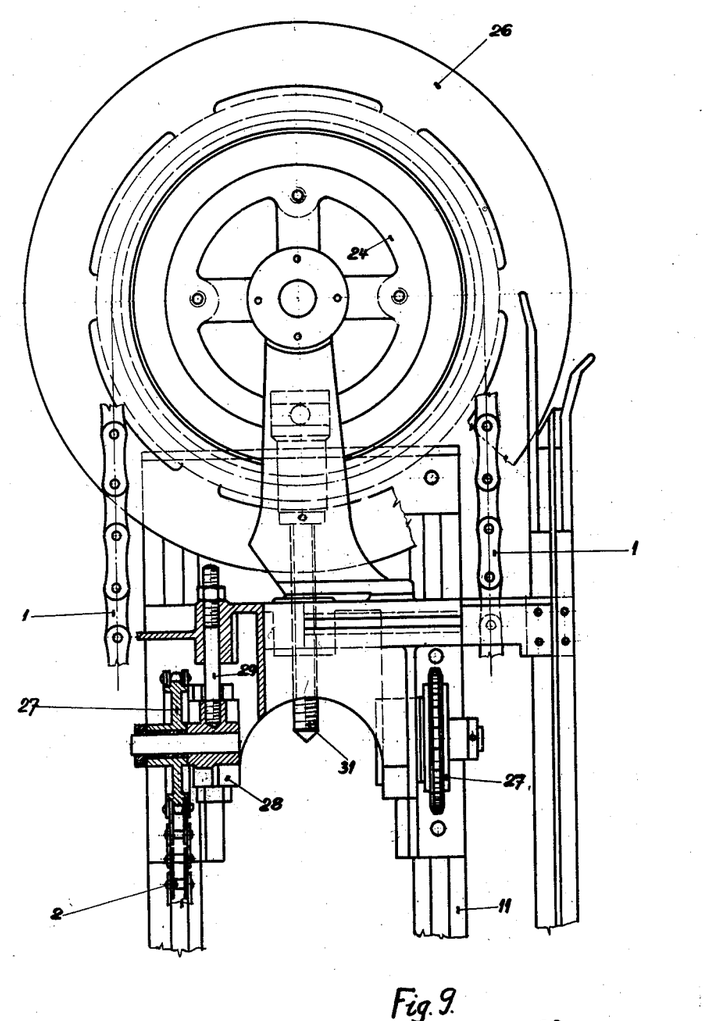
Fig. 9 illustrates the gear, partly in section, for driving the chains for the toothed segment mechanism.

The chains 2 driving the carriage mechanism are tensioned by means of sprocket wheels 27 which are located on a rod in a bearing bracket adjustable by a positioning screw 29.

The whole tensioning arrangement is mounted on a stand 30 (Fig. 8) which can be adjusted by a positioning screw 31 engaging with a nut of the said stand. By this screw 31 not only the upper chain 1 but also the chains 2 are simultaneously tensioned. By means of the positioning screws 29 only the chains 2 are tensioned.

The carriage for feeding the last consists of a body 32 (Figs. 10 and 11) which is engaged by the feed chain 1 by means of pins in the bores 33. A rod 34 is fixed in the carriage body 32 and on this rod the work table 35 (Fig. 10) serving for the simultaneous feed of the necessary materials at the individual work positions is rigidly fixed. A main shaft 36 is arranged in the body 32, on which shaft the main driving toothed wheel 37 is keyed, such wheel having four holes arranged at 90° to each other, corresponding to the four positions of the last about the axis of the shaft 50. A ball bearing is provided at the end of the shaft 36 and this serves for an inner guide for the carriage and moves in the channel iron 20 (Fig. 6). On the side arms of the carriage body 32 (Fig. 10) two travelling rollers are fixed on rods and ball bearings and move on the rails 19 (Fig. 6).

A coupling 39 (Figs. 10 and 13) is movable on the main shaft 36 and has four recesses 40 in which the pin 41 is adapted to fit and, corresponding to the four angular positions of the last, the coupling 39 has on its upper side two bores for the securing pins 42 and two openings for the guide bolts 43 which have springs 44 (Fig. 11) which exerts pressure on the coupling 39 towards the carriage body 32. The surface of the carriage body 32 abutting on the coupling 39 has four holes 45 arranged at 90° to each other, these corresponding to the turning of the whole carriage head around the axis of the shaft 36 to 90°, 180°, 270° and 360°.

The coupling 39 (Fig. 10) is guided by means of the feather 46 secured in the coupling by a pin 47, which feather is let into a corresponding groove in the carriage head 48.

The end of the main shaft 36 (Fig. 10) is constructed as a bevel wheel which engages in the bevel wheel 49 of the shaft 50 on the upper end of which the last holder 51 is arranged and made fast by a pin. In this holder 51 the pin 52 is adjustably mounted. The one end of this pin 52 has a form corresponding to a recess in the projection 53 of the last, into which recess the pin 52 is constantly pressed by a spring 54.

Figure 10:
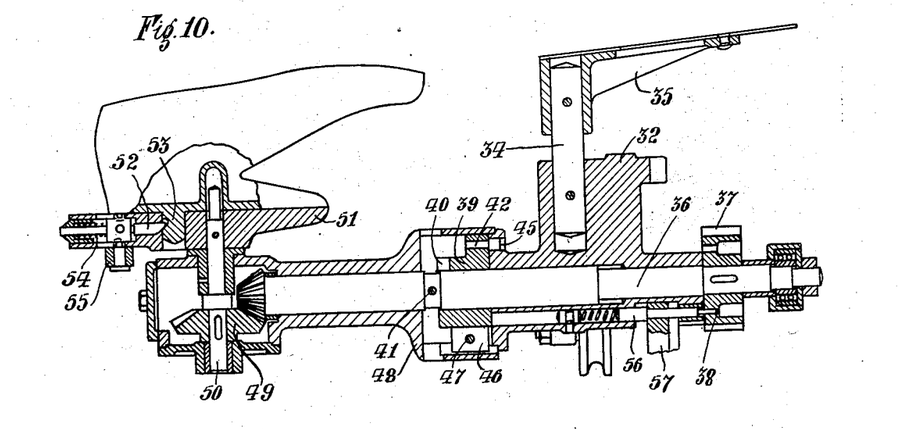
Fig. 10 is a vertical section through the feed carriage.

The pin 52 can be drawn out of the recess in the last by means of a roller 55 either through manual operation or automatically by a force acting against the pressure of the spring 54.

Figures 11, 12, 13, 14:
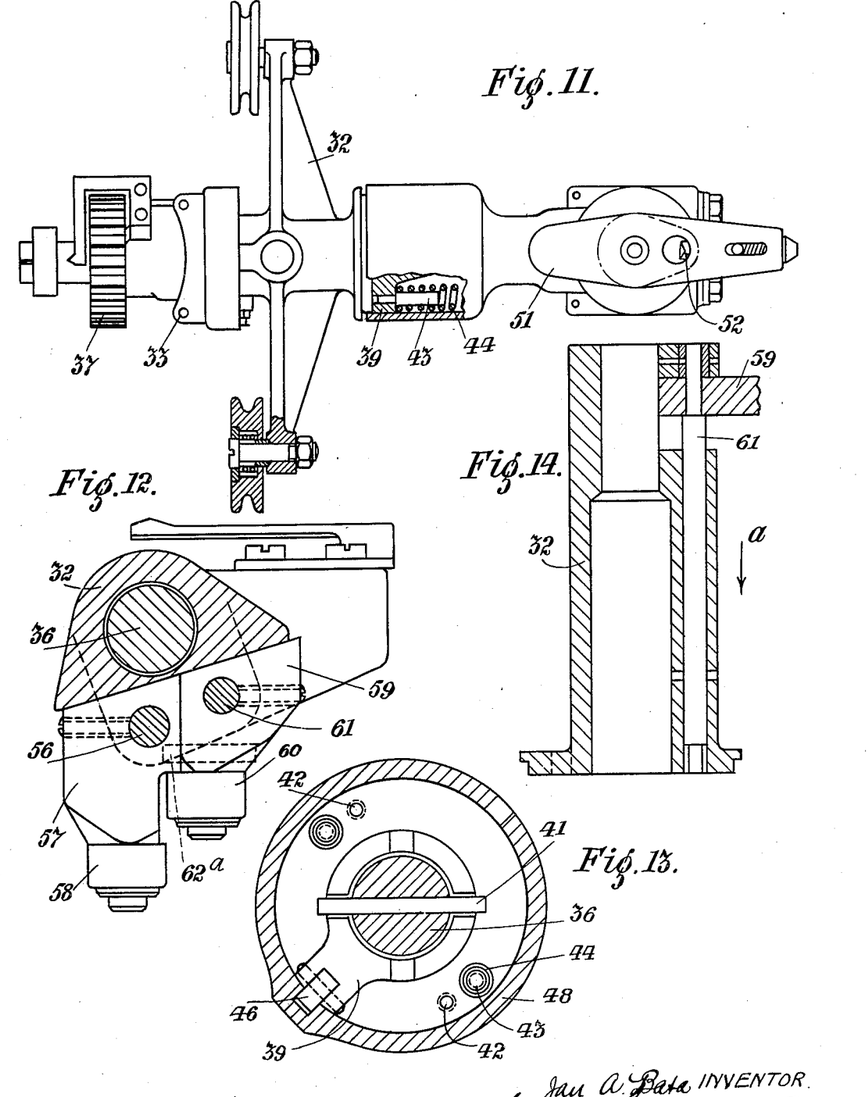
Fig. 11 is a plan view of the feed carriage partly sectioned.
Fig. 12 is a plan view of the control stops on the rear side of the carriage.
Fig. 13 is a sectional view through the carriage looking in the direction of the last at the coupling 65 of the carriage head and body.
Fig. 14 is a section of the side of the carriage at the operating rod of the coupling.

If the coupling 39 is in the position illustrated in Fig. 10 the recesses 40 are outside the pins 41 and if the securing pin 56 is pressed as hereinafter described out of the holes 38, the last can be turned around the axis of the shaft 50 by power transmitted to the shaft 50 through the shaft 36 and the bevel gearing from the toothed wheel 37. The withdrawal of the securing pin 56 is effected by a stop 57 provided with a roller 58 (Fig. 12).

If, on the other hand, the carriage head 48 (Fig. 10) is to be turned around the shaft 36, the securing pin 56 must likewise be disengaged from the respective hole 38 and, in addition, on operating rod 61, parallel to the pin 56 (see Figs. 12 and 14) must be moved in the same direction as the pin 56 (see the arrow $a$ in the sectional plan view Fig. 14) so as to overcome the pressure of the spring 44 (Fig. 11) and cause the two pins 42 (Fig. 10) secured in the coupling 39 to move out of the openings 45 of the adjacent surface of the carriage body 32 and engage the recesses 40 of the coupling 39 with the pin 41.

Thereupon the carriage head 48 can be turned around the axis of the shaft 36 by operation of the toothed wheel 37.

The mechanism of the carriage is driven at the individual working positions in such a manner that whenever the carriage comes into a working position, the segment 63 which engages with its teeth 64 in the toothed wheel 37 (Figs. 10 and 16) is set in motion by means of the chains 2 and the sprocket wheels 62. The driving mechanism for the segment is carried by the stand 72 (Fig. 15) which is screwed to the longitudinal beam 11 (Fig. 1) of the feed track at the desired position where the form of the segment corresponds to the work to be carried out on the shoe.

Figure 15:
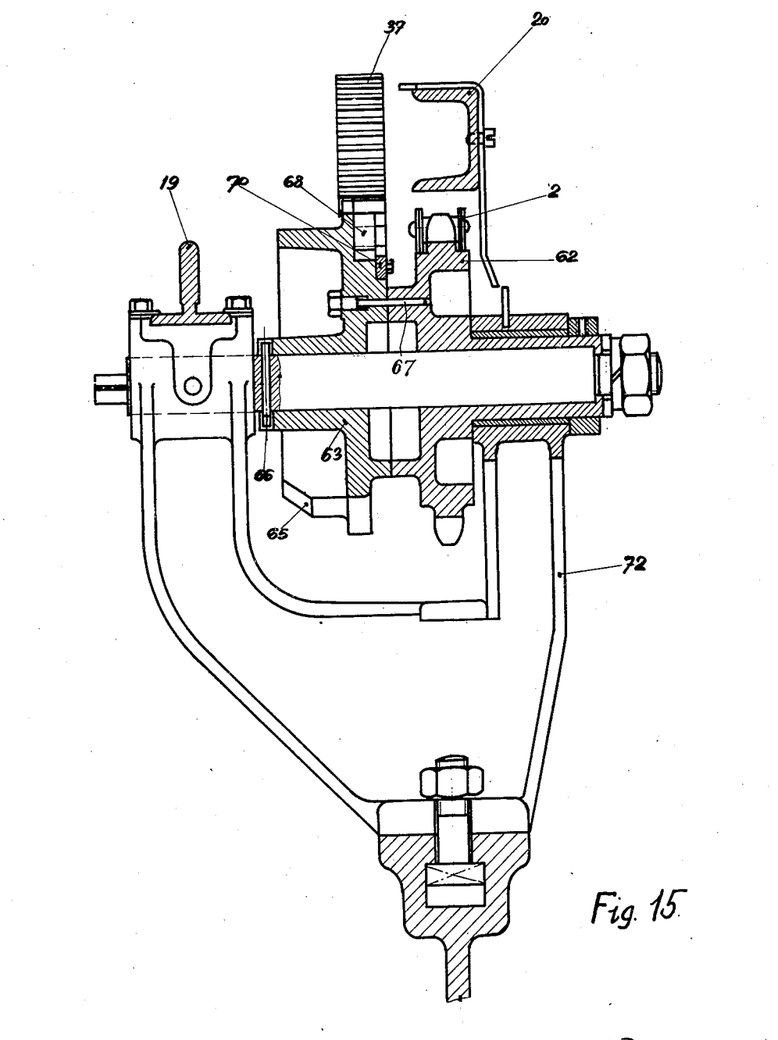
Fig. 15 is a side view partly sectioned of the stand for the segment driving mechanism;

A segment serving for turning the last about its vertical axis is shown in Figs. 15 to 17 and consists of a nave 63 which has at one side a recess for the pin 66 passing through the shaft and a bolt 67 serving to connect the segment to the sprocket wheel 62 driven by the chain 2. On the rear side of the segment, a cam 65 is provided which presses the roller 58 (Fig. 12) with the stop 57 to the side, so as to slide the spring pressed securing pin 56 out of the hole of the toothed wheel 37 whereupon this cam holds the pin out during the whole duration of engagement of the teeth of the segment 64 The end tooth of the segment consists of a spring pressed tooth 68 (Fig. 17) so that it can pass out of engagement, since the re-engagement of the securing pin 56 (Fig. 10) in the holes 38 of the toothed wheel 37 must take place while the teeth 64 of the segment still stand in engagement.

The spring pressed tooth 68 (Fig. 17) has a pin in the rim of the teeth 64 and is pressed by a spring 69 into the engaging position. The retainer 70 screwed in place by screws 71 holds the tooth 68 against sideways displacement.

The teeth 64 and the runway 65 of the segment are each arranged according to the positions into which the last or the carriage head is to be brought.

Thus, in the case of a segment for turning the whole carriage head 48 about its horizontal axis, the cam such as 65 of the segment is made of greater radius that that illustrated so as to co-act with a roller 60 on a stop 59 (Fig 12). Such cam would then press the roller 60 to the side, so as to slide the rod 61 in the direction of the arrow $a$ (Fig. 14) and thereby engage the recesses 40 of the coupling 39 with the pin 41 and disengaged the securing pin 56 from the respective hole 38 of the toothed wheel 37, the latter action being effected along with the first action by virtue of the stop 59 having fixed thereon a pin 62a which causes the stop 57 to move in conjunction with the stop 59 and thereby move the pin 56 in the same direction as the rod 61.

After each turning movement of the last or carriage head 48, the securing pin 56 springs back into engagement with a hole 38 of the toothed wheel 37 and thus the last or head 48 is prevented from moving in the individual working positions to which it is adjusted.

Preferably, the arrangement of the apparatus is such as to permit the use of pneumatic and hydraulic as well as mechanical power for driving the individual machines for the footwear treatment. In the manufacture of the shoes, electric, gas or hot-air heated lasts may be used for the purpose of drying or vulcanizing the shoe. Likewise, the last or shoe may be cooled by water or air.

The general operation of the mechanism hereinbefore described is as follows:—

When the axle 4 (Fig. 1) is set in motion by its driving mechanism, the sprocket wheel 3 causes the feed chain 1 to move all the feed carriages along the track 19 to 21 with a velocity which accelerates from zero until the feed carriages at the sides of the machine reach a position midway between the corresponding adjoining segments 64 and then drops to zero when the feed carriages are opposite such segments. The movement of the feed carriages into such position is also accompanied by the simultaneous disengagement of the securing pin 56 of the respective carriages from the corresponding gear wheel 37. When the feed carriages have thus been transferred forward a distance equal to the interval between the adjacent segments 64, the motion of the feed chain 1 and axle 4 ceases and the driving mechanism then effects rotation of the shaft 9 (Figs. 4 and 5) so as to drive the bevel wheels 6, 7 and sprocket wheel 8 effect movement of the chains 2 at each side of the machine. On movement of each feed chain 2 the carriages having their gear wheel 37 in engagement with a segment 64 have their last adjusted by the rotation of the said gear wheel 37 so as to effect movement of the last about either a vertical or horizontal axis as previously referred to. This adjustment being effected, the rotation of the shaft 9 is stopped and the operatives then proceed to perform their particular operation on the shoes delivered opposite to them. The speed of the driving mechanism is adjusted so that sufficient time is permitted for the operatives to complete their respective operations on the shoes before the axle 4 is again set in motion to cause the chain 1 to move the feed carriages one stage forward once more.

This stage by stage movement of the feed carriages with the particular adjustment of the lasts at the different working positions along each side of the machine is repeated continuously and the manufacture of each shoe is advanced one step as it passes successively to each different working position.

I claim:—

1. For the manufacture of footwear, feed and work treatment apparatus comprising a plurality of carriage means, a track for said carriage means, means for moving the feed carriage means to different working positions along said track, a last adjustably arranged on each carriage means, and intermittently operated means arranged at said working positions whereby, when the carriage means are moved up to each working position, each last is automatically turned to the required position.

2. Apparatus, as claimed in claim 1, comprising toothed segment means, a cam surface on said segment means, and means whereby said segment means is set in motion to effect movement of said last in each working position of the carriage means.

3. Apparatus, as claimed in claim 1, comprising chain means for moving said carriage means, separate chain means for operating said lasts, and means whereby the chain means for said lasts and chain means for said carriage means can have the tension thereof varied independently of each other.

4. In the manufacture of footwear, combined feed and work-treatment apparatus comprising a plurality of lasts, a carriage for each last, means for simultaneously moving said carriage periodically into different working positions, means whereby said last is adjustable into different positions on said carriage, locking means for holding said last in said positions, a cam device adapted to release said locking means and permit movement of said last, and toothed segment means for moving said last into its different position automatically at each working position of said carriage.

5. Apparatus as claimed in claim 4, comprising a common chain means whereby said toothed segment means and cam device for each carriage is operated.

6. Apparatus as claimed in claim 4, comprising a depressible tooth at the trailing end of said toothed segment means and spring means whereby said tooth is normally pressed upwards into line with the remainder of the teeth of said segment means.

7. For footwear manufacturing apparatus having lasts mounted on carriages adapted to be fed into different working positions, the combination of adjusting means on each carriage whereby the last thereon is adjustable into different positions, a driving unit, and transmission gearing whereby said driving unit is adapted to drive the adjusting means of each last when the corresponding carriage is stationed in any of its working positions.

8. For footwear manufacturing apparatus having lasts mounted on carriages and feed means whereby said carriages are fed into different working positions, the combination of toothed segment gear means at each of said working positions, continuously acting driving means, gearing adapted to be driven intermittently by said driving means, transmission means adapted to drive said segment means from said gearing, and adjustment means on each of said carriages adapted to be operated at said working positions by said segment means to adjust the last on said carriage.

9. The combination claimed in claim 7 comprising a locking device for releasably holding said last on said carriage, and means for operating said locking device to enable said last to be interchanged by another.

JAN A. BATA.